(12) United States Patent
Reshad et al.

(10) Patent No.: US 11,850,887 B2
(45) Date of Patent: Dec. 26, 2023

(54) MANUALLY-ROTATABLE HUBCAP

(71) Applicant: ATI, Inc., Mt. Vernon, IN (US)

(72) Inventors: Jamsheed Reshad, Newburgh, IN (US); Timothy D. Stacy, Mt. Vernon, IN (US)

(73) Assignee: ATI, Inc., Mt. Vernon, IN (US)

( * ) Notice: Subject to any disclaimer, the term of this patent is extended or adjusted under 35 U.S.C. 154(b) by 844 days.

(21) Appl. No.: 16/590,598

(22) Filed: Oct. 2, 2019

(65) Prior Publication Data

US 2021/0101406 A1    Apr. 8, 2021

(51) Int. Cl.
*B60B 7/00* (2006.01)
(52) U.S. Cl.
CPC .................. *B60B 7/0013* (2013.01)
(58) Field of Classification Search
CPC ............................. B60B 7/0013; B60B 7/00
USPC ........................................................ 301/108
See application file for complete search history.

(56) References Cited

U.S. PATENT DOCUMENTS

| | | | | |
|---|---|---|---|---|
| 9,290,044 | B2* | 3/2016 | Leung | B60B 7/002 |
| 9,908,364 | B2* | 3/2018 | Haynes | B60B 7/068 |
| 11,292,299 | B2* | 4/2022 | Ingram | B60C 23/00318 |
| 2014/0152081 | A1* | 6/2014 | Leung | B60B 7/0013 |
| | | | | 301/108.2 |
| 2018/0056733 | A1* | 3/2018 | Ingram | B60C 23/006 |
| 2019/0135186 | A1* | 5/2019 | Hagedorn | B60B 7/0066 |

FOREIGN PATENT DOCUMENTS

EP             310777 A *  4/1989  ........... B60B 7/0013

* cited by examiner

*Primary Examiner* — James A Shriver, II
*Assistant Examiner* — Hilary L Johns
(74) *Attorney, Agent, or Firm* — Rickard DeMille; Rebecca Henkel

(57) ABSTRACT

A manually-rotatable hubcap for wheel/axle apparatus, the wheel configured to rotate with respect to the axle and having a wheel inner surface substantially parallel to the axle, the hubcap comprising: (a) a hubcap body having a lubrication filling port and a sealing surface facing the wheel inner surface; (b) retention structure for attaching the hubcap body to the wheel; and (c) a seal between the sealing surface and the wheel inner surface.

9 Claims, 12 Drawing Sheets

MANUALLY-ROTATABLE HUBCAP

FIELD OF THE INVENTION

This invention generally relates to wheel/axle apparatus such as used on vehicles of many types and on other machinery, and more particularly to hubcaps on wheel/axle apparatus which requires lubrication during periodic maintenance.

BACKGROUND OF THE INVENTION

There are numerous vehicles and other machinery throughout the world which have wheel/axle apparatus which requires lubrication during periodic maintenance. In some of these machines, the wheel/axle apparatus includes a hubcap which is used to seal the lubrication within the apparatus and to provide a means of replenishing or replacing lubricant into the internal bearing structures within wheel/axle apparatus. FIGS. 1, 1A, and 1B show a typical prior art embodiment of a hubcap employed in such apparatus.

FIGS. 1, 1A, and 1B illustrate a prior art hubcap configuration 300 for wheel/axle apparatus which includes a wheel 302 mounted on a wheel mount 302m and turning on an axle 14 supported by two roller bearings 16. Each roller bearing 16 includes an inner race 18 installed on axle 14, an outer race 20 installed in wheel mount 302m, and a plurality of rollers 22. A hubcap 304 includes a hubcap body 306, a lubrication fill port 308 and a fill plug 310. Hubcap 304 is mounted to wheel mount 302m with five fasteners 312 and thus turns with wheel 302. Lubricant is sealed within the apparatus with an O-ring seal 314 located at a corner 302c of wheel mount 302m and in a groove 306g of hubcap body 306. Alternatively, O-ring 314 (or other type of seal) may be located between a wheel sealing surface 302s and a hubcap-body sealing surface 306s, as indicated by such reference numbers in FIG. 1B.

Although most present hubcaps on such wheel/axle apparatus are positioned on the axis of the axle, currently there are some prior art hubcaps in which the fill port is located offset from the axis of the axle. When the fill port is offset from the axle axis, and it is necessary to replenish or replace lubricant in the apparatus at a level generally above the center of the axle, it is often necessary to rotate the wheel in order to place the fill port at a higher position. This may then require that a vehicle be moved to achieve such wheel orientation, and if there are a large number of wheels to be serviced, a considerable amount of time is required to reposition the vehicle accordingly. Thus it is advantageous to provide a hubcap for wheel/axle apparatus which enables the hubcap to be rotated relative to the wheel while retaining position of the vehicle and the lubricant seal.

SUMMARY OF THE INVENTION

The present invention is a manually-rotatable hubcap for wheel/axle apparatus in which the wheel is configured to rotate with respect to the axle, and the wheel has a wheel inner surface which is substantially parallel to the axle. The inventive hubcap comprises: (a) a hubcap body which has a lubrication filling port and a sealing surface facing the wheel inner surface; (b) retention structure for attaching the hubcap body to the wheel; and (c) a seal between the sealing surface and the wheel inner surface.

In highly-preferred embodiments of the inventive hubcap, the axle has an axle axis, and the lubrication filling port is offset from the axle axis. In some of these embodiments, the hubcap body further includes a grip to facilitate manual rotation of the hubcap.

In some preferred embodiments, the sealing surface includes a groove and the seal is positioned therein, and in some embodiments, the wheel inner surface includes a groove and the seal is positioned therein. The seal may be an O-ring.

In highly-preferred embodiments of the present invention, the retention structure is a retaining ring, and in other embodiments, the retention structure includes one or more fasteners attaching the hubcap body to the wheel.

DETAILED DESCRIPTION OF PREFERRED EMBODIMENTS

Figure 1:
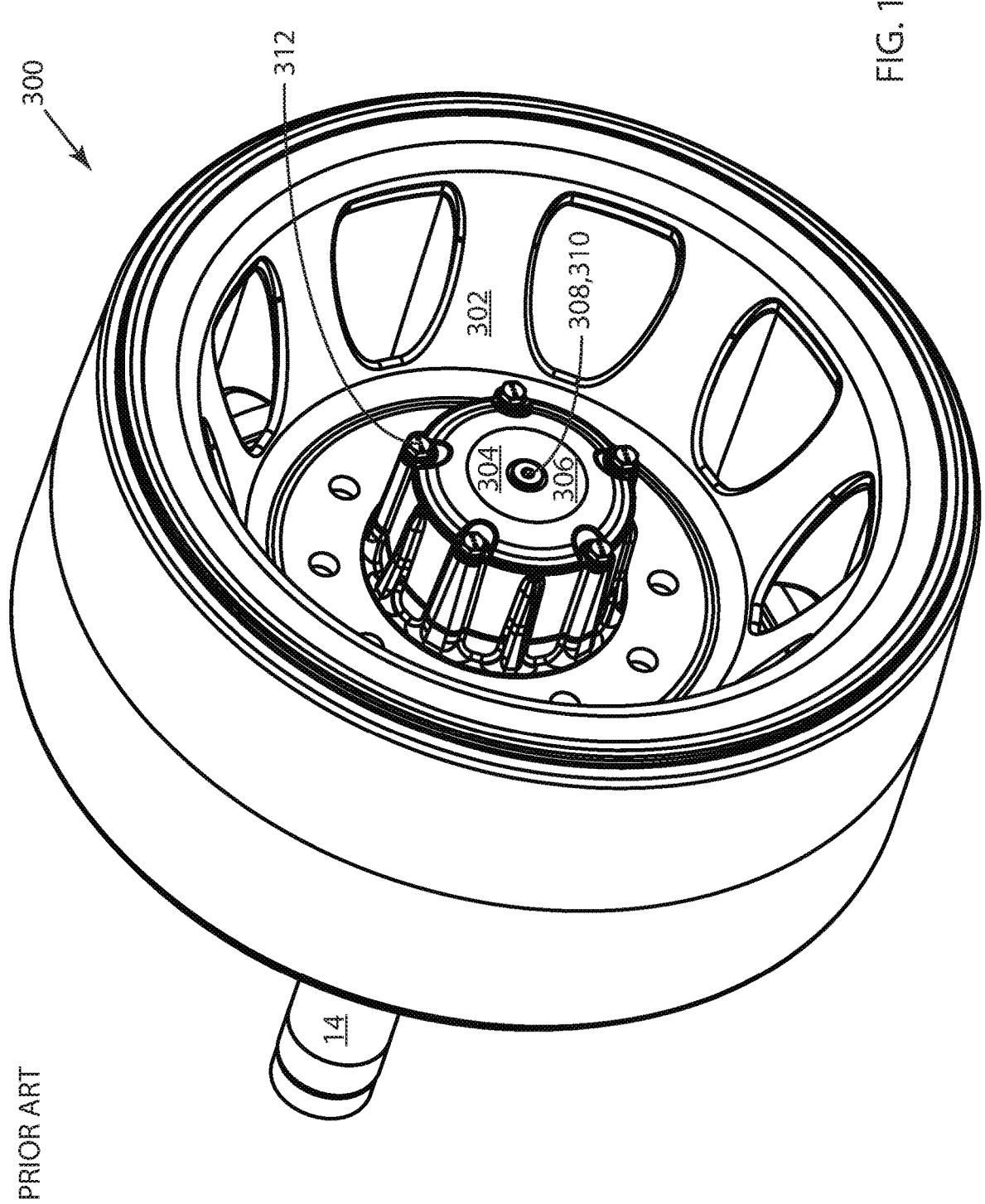
FIG. 1 is a perspective drawing of a prior art hubcap having a lubrication filling port and mounted on wheel/axle apparatus.
Figure 1A:
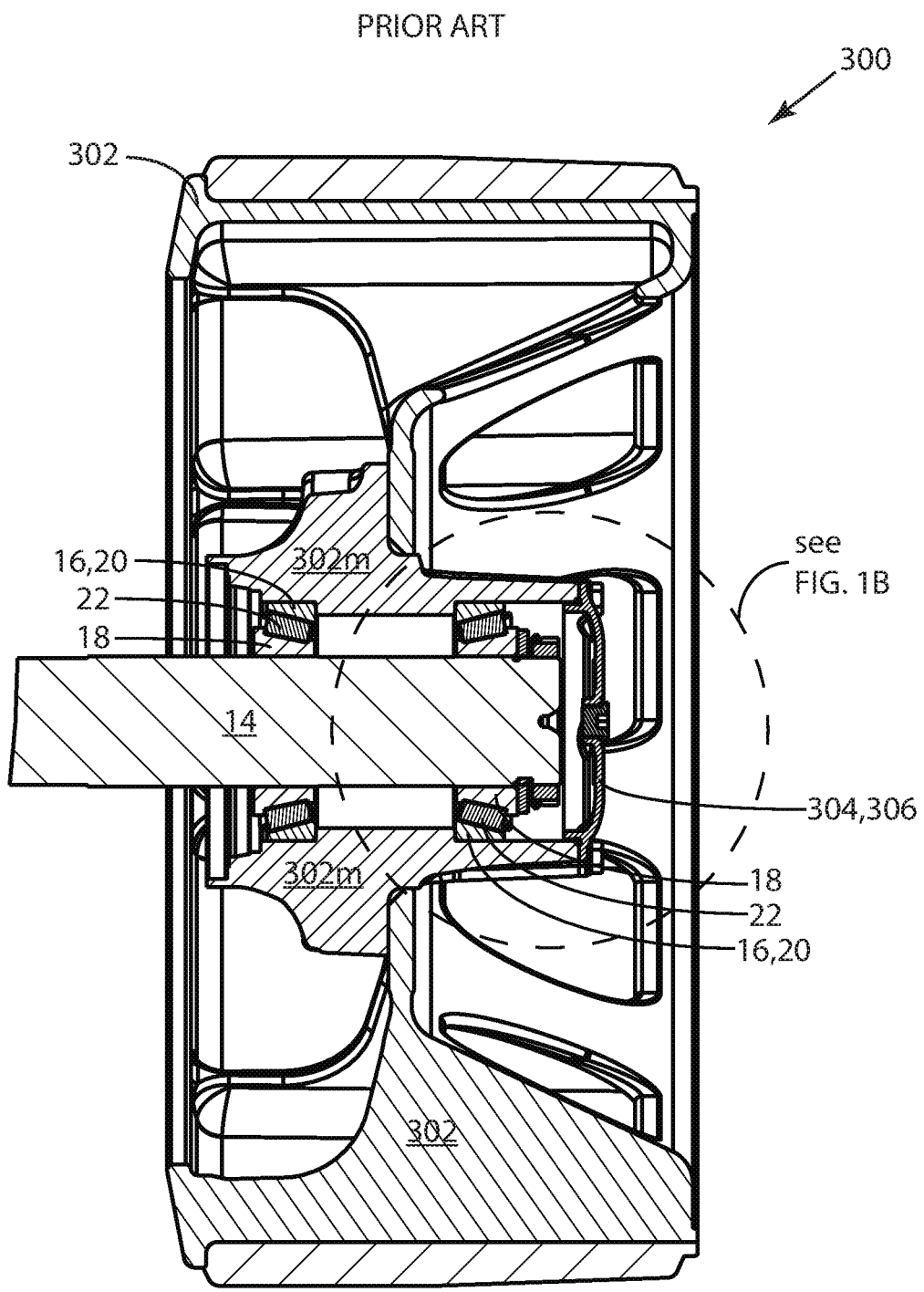
FIG. 1A is a side cutaway cross-sectional drawing of the prior art hubcap of FIG. 1.
Figure 1B:
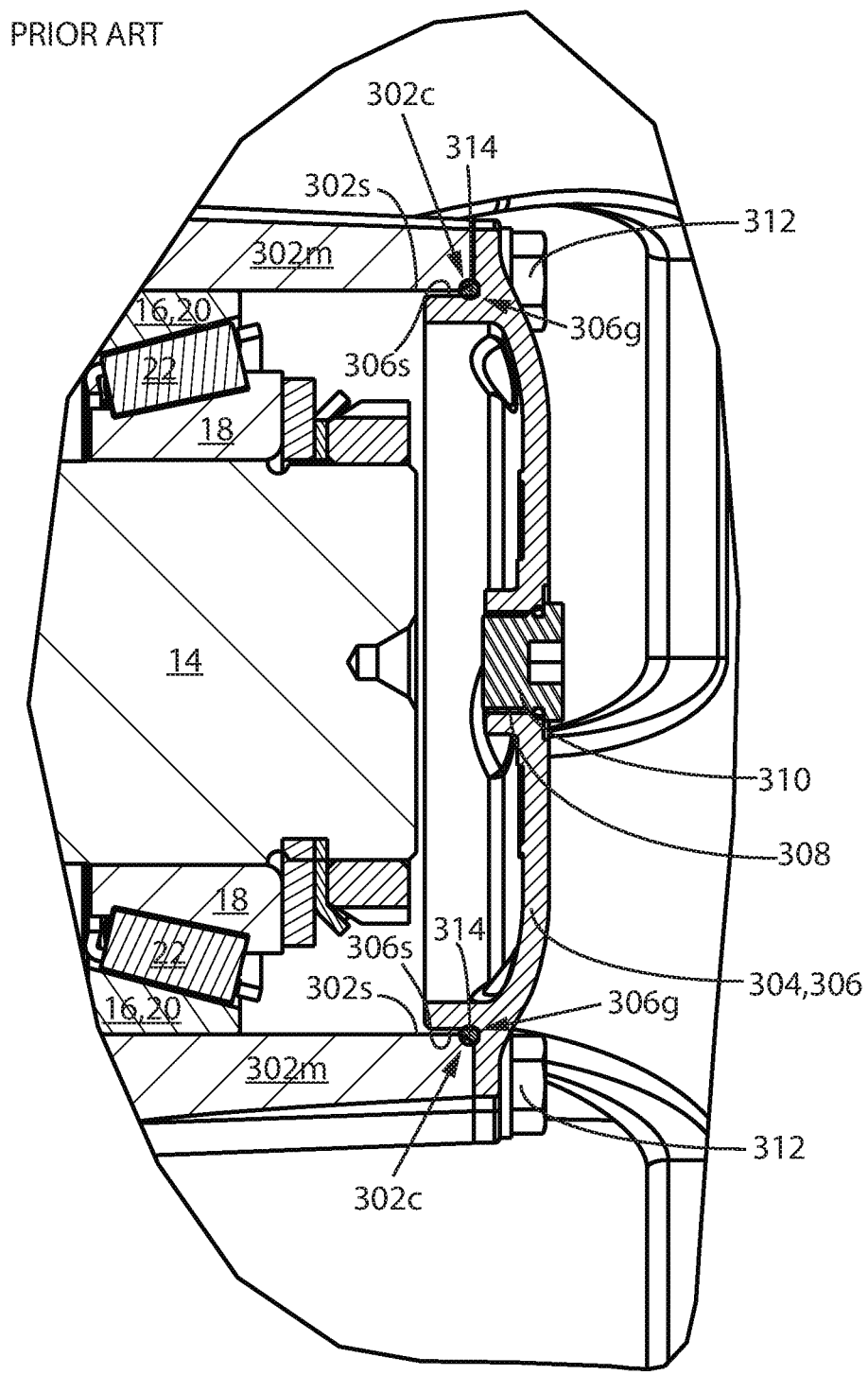
FIG. 1B is an enlarged drawing of an indicated section of FIG. 1A.
Figure 2:
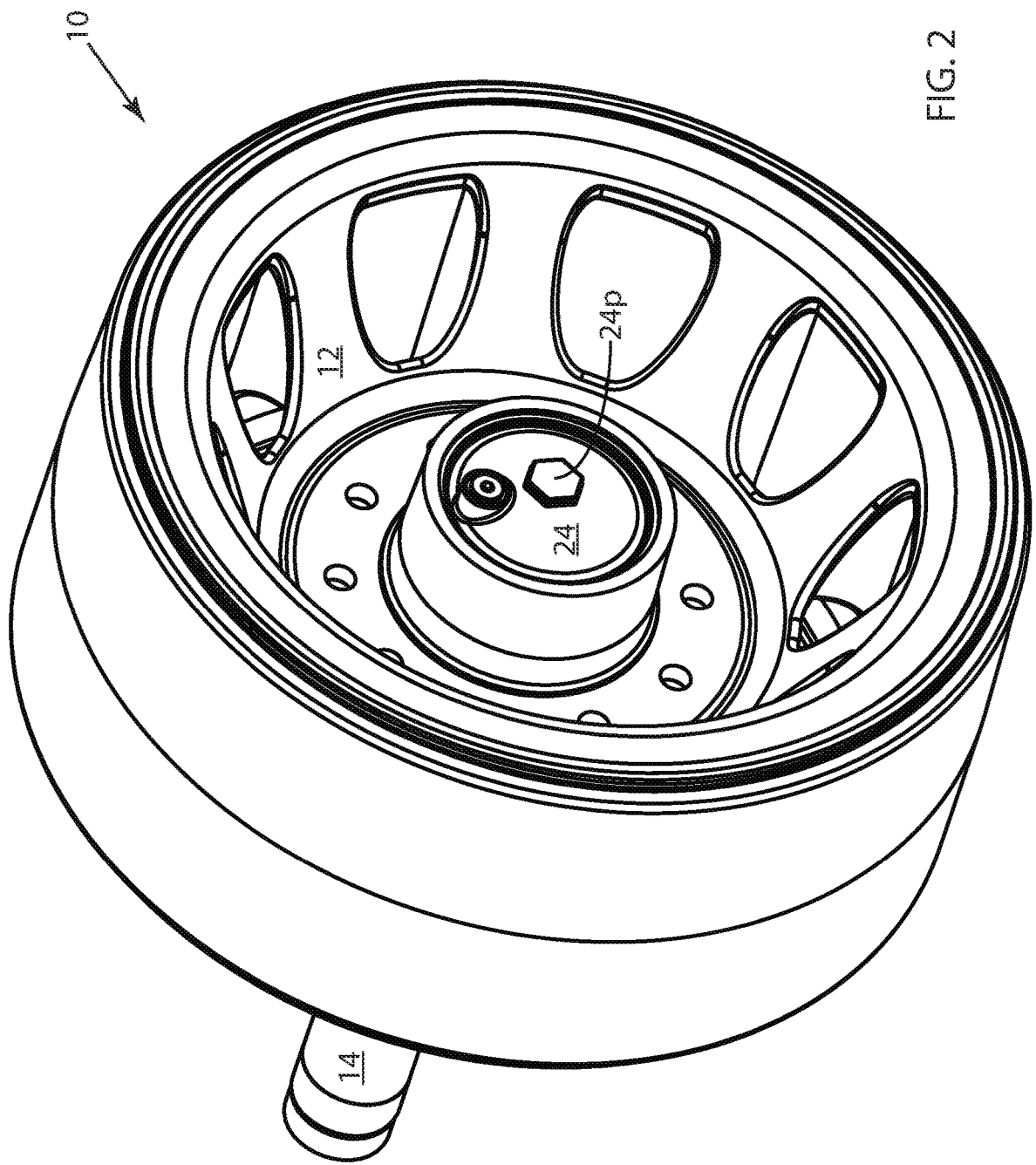
FIG. 2 is a perspective drawing of one embodiment of the inventive manually-rotatable hubcap for wheel/axle apparatus disclosed herein.
Figure 2A:
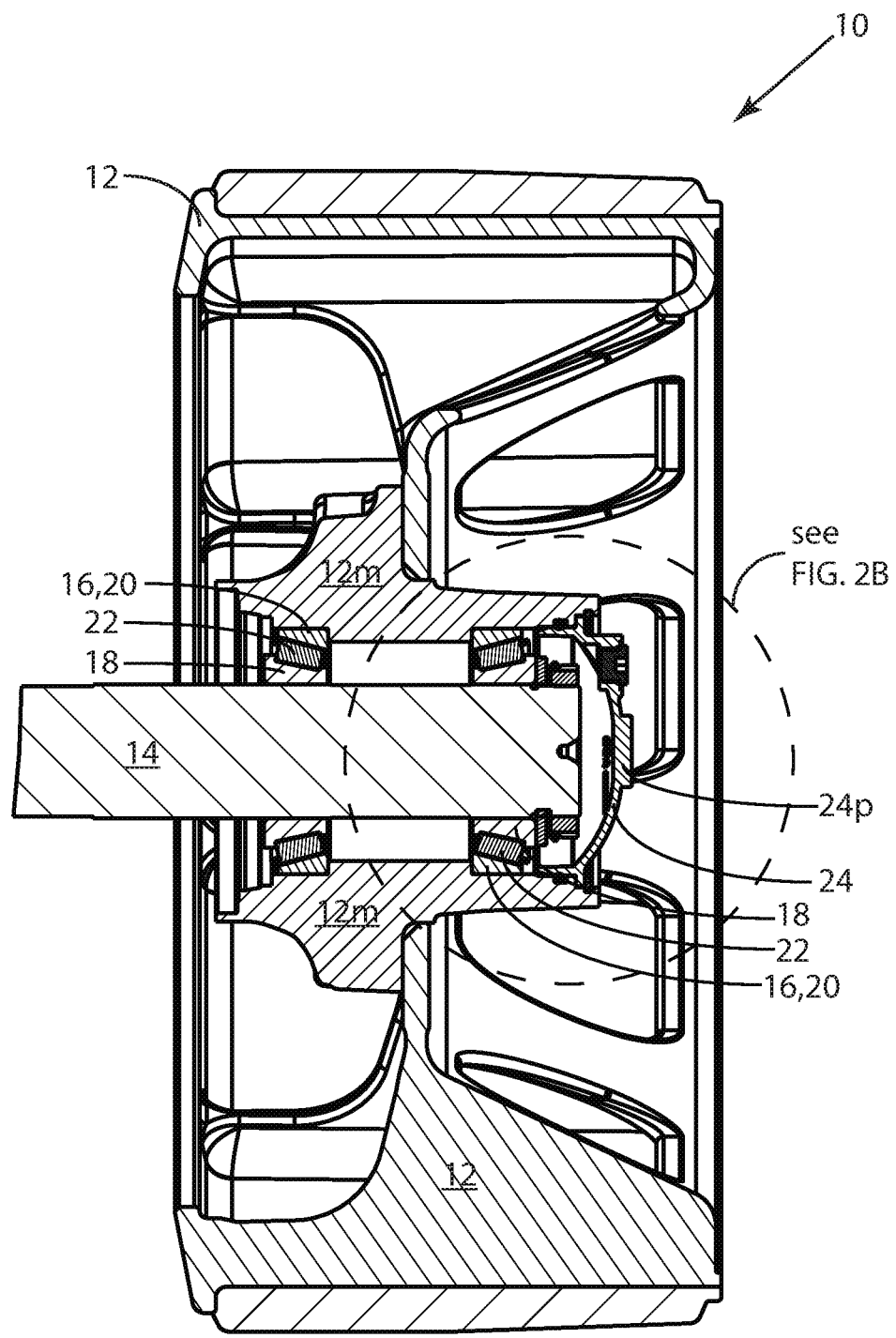
FIG. 2A is a side cutaway cross-sectional drawing of the embodiment of the inventive manually-rotatable hubcap for wheel/axle apparatus of FIG. 2.
Figure 2B:
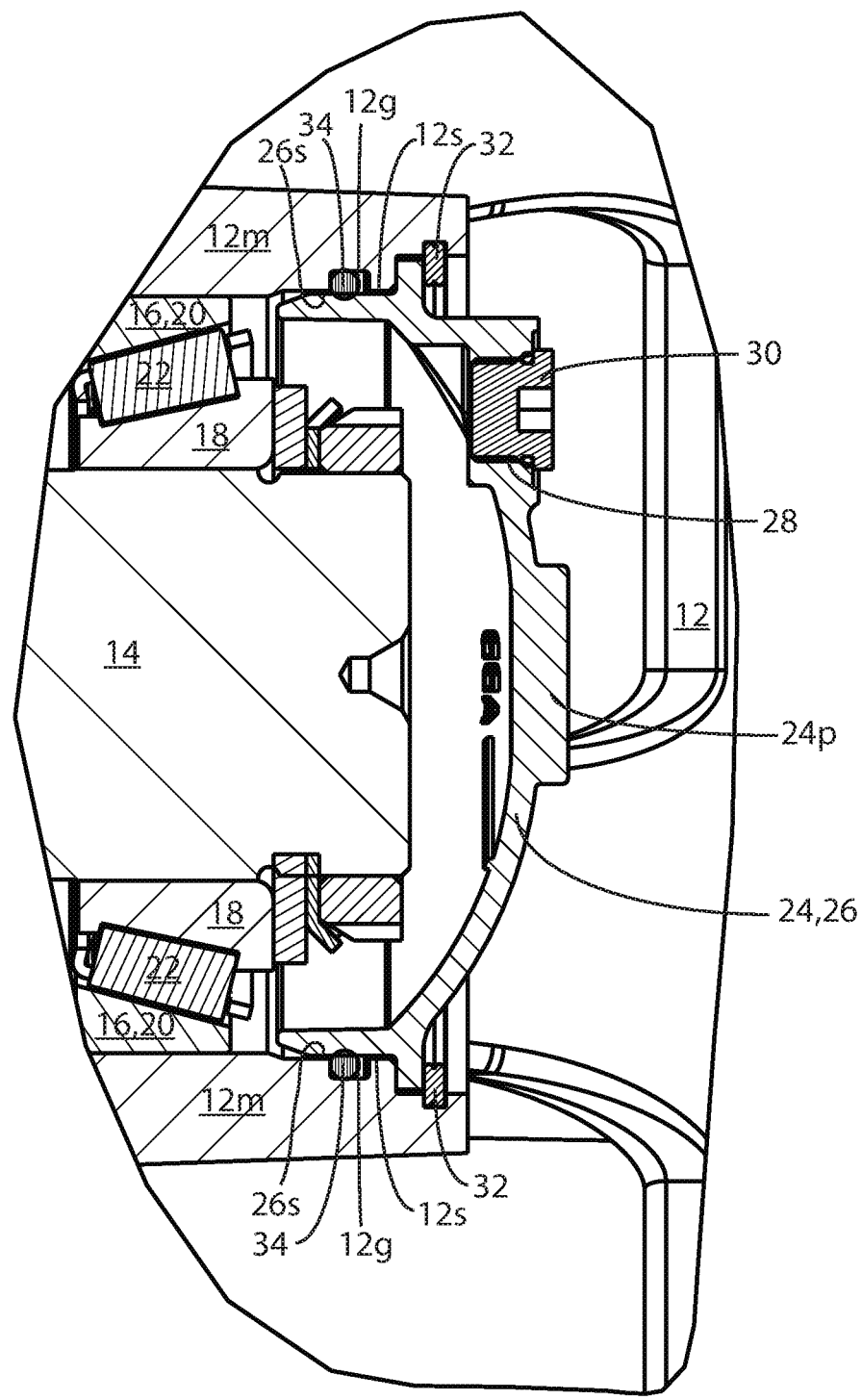
FIG. 2B is an enlarged drawing of an indicated section of FIG. 2A.
Figure 3:
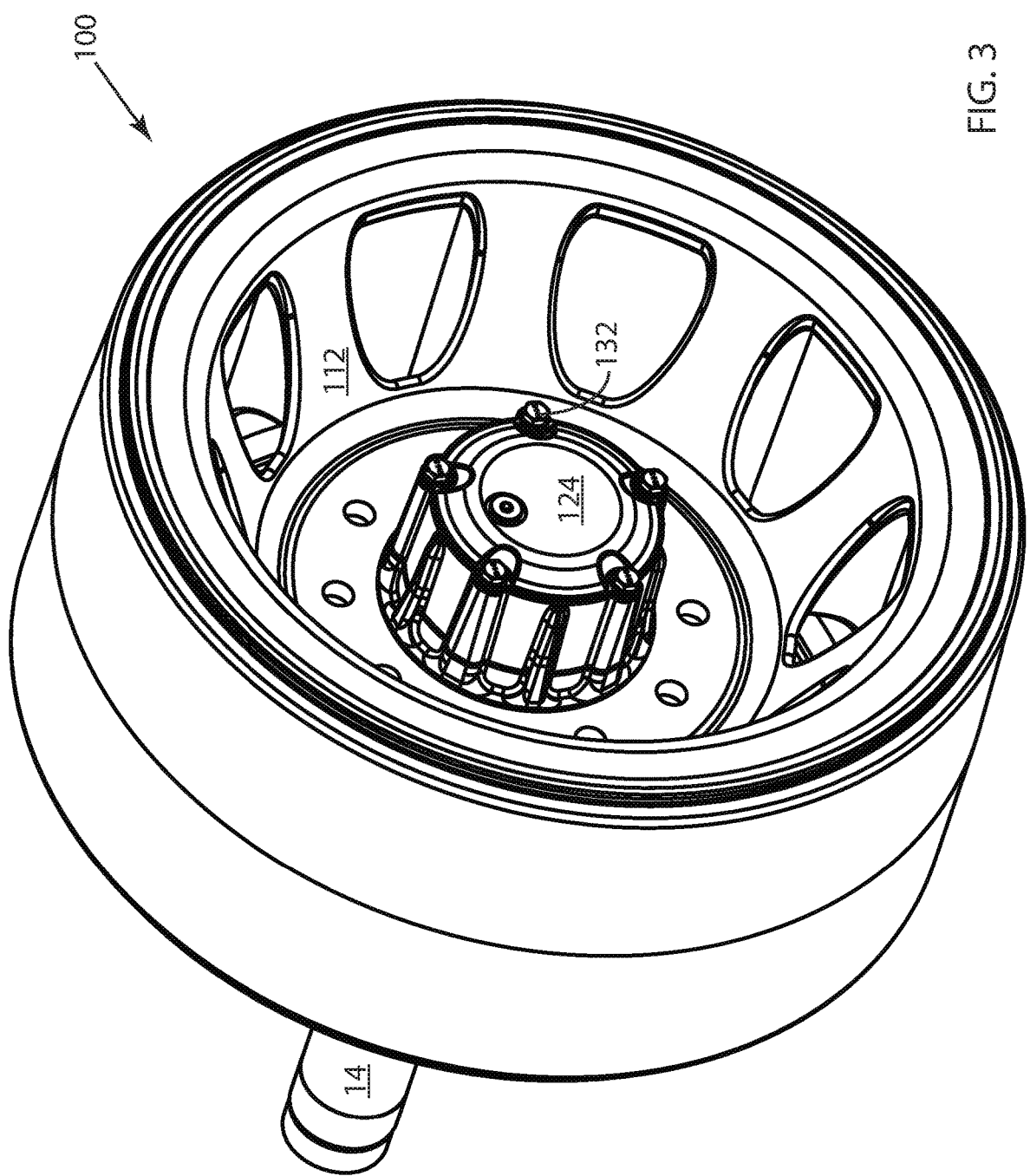
FIG. 3 is a perspective drawing of an alternative embodiment of the inventive manually-rotatable hubcap for wheel/axle apparatus disclosed herein.
Figure 3A:
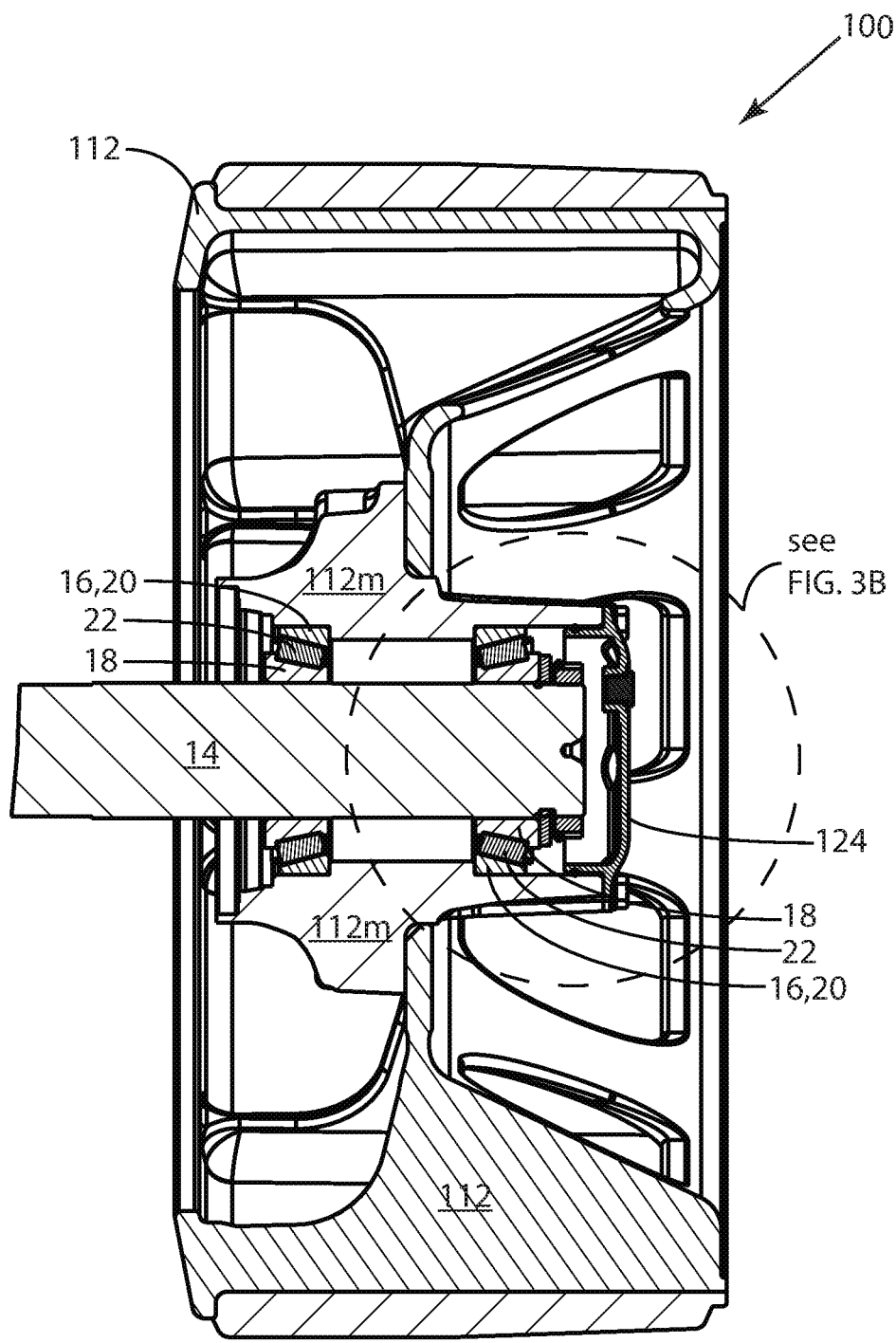
FIG. 3A is a side cutaway cross-sectional drawing of the embodiment of the inventive manually-rotatable hubcap for wheel/axle apparatus of FIG. 3.
Figure 3B:
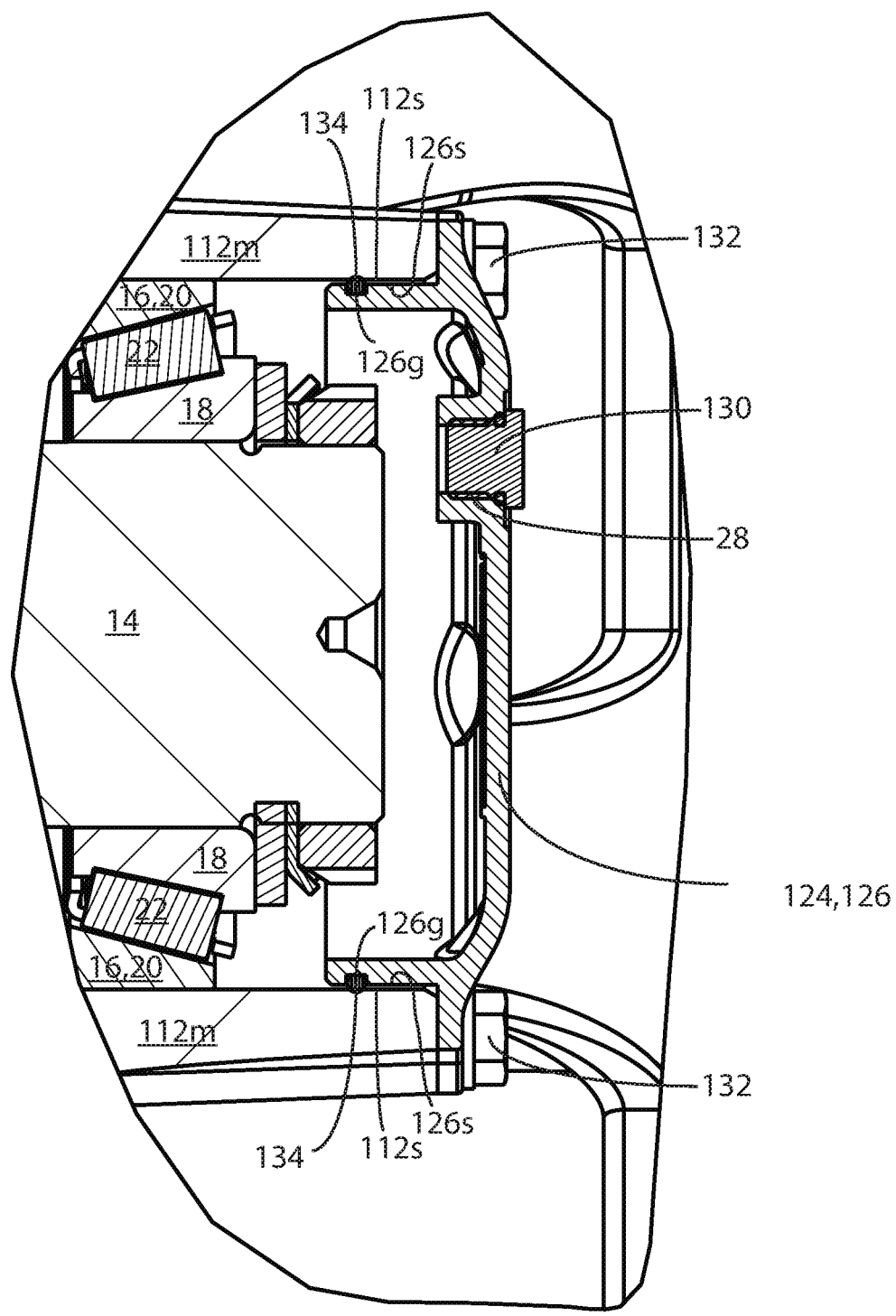
FIG. 3B is an enlarged drawing of an indicated section of FIG. 3A.
Figure 4:
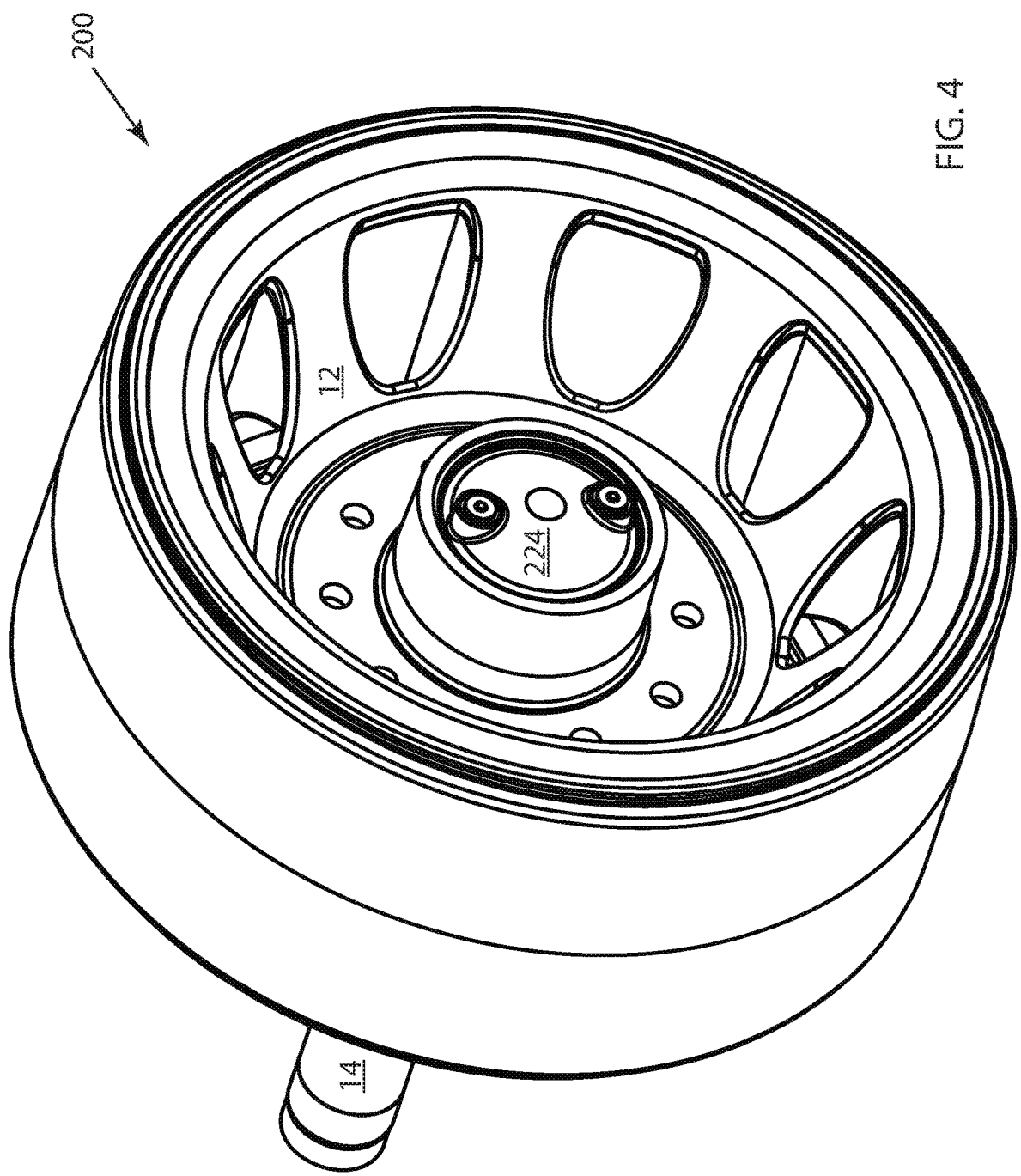
FIG. 4 is a perspective drawing of a second alternative embodiment of the inventive manually-rotatable hubcap for wheel/axle apparatus disclosed herein.
Figure 4A:
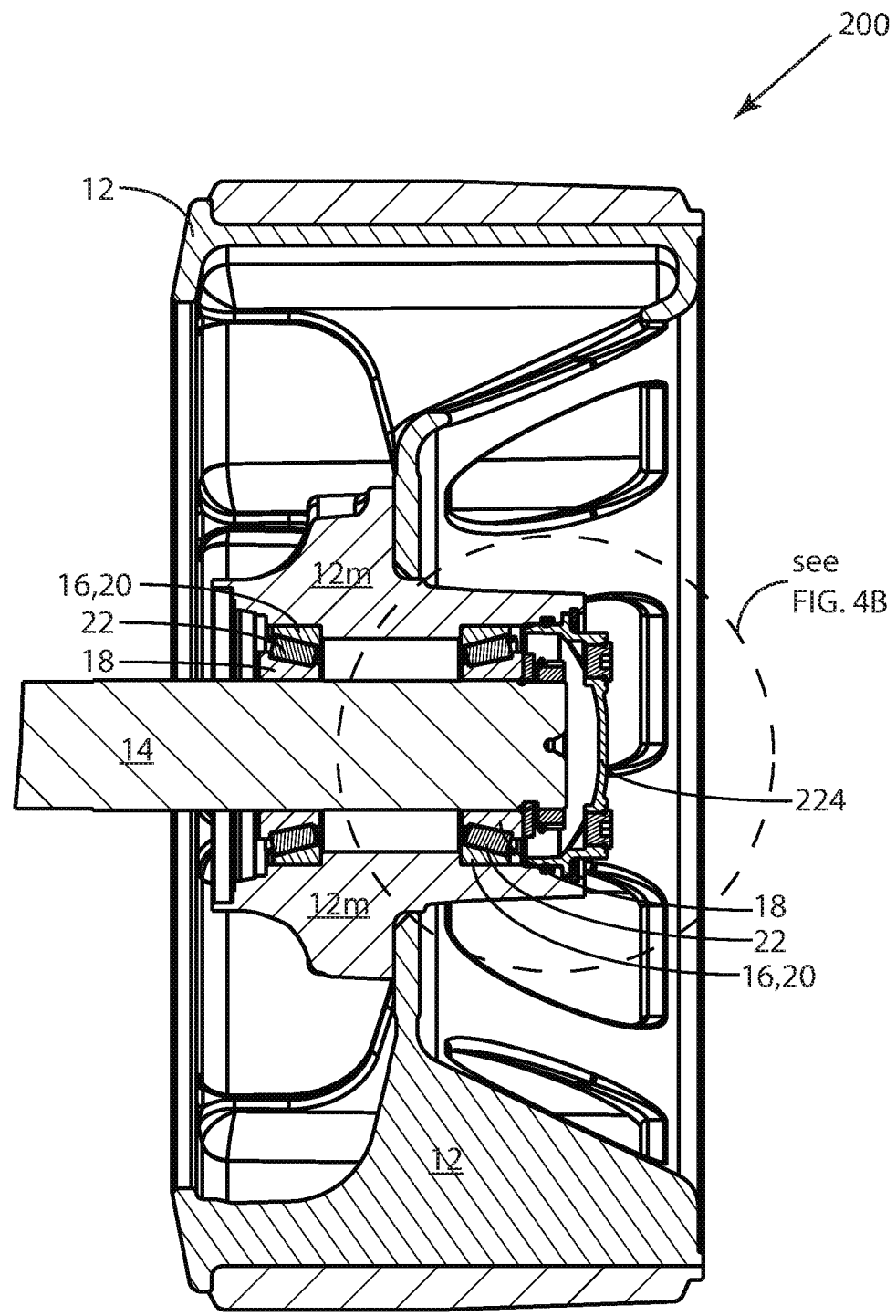
FIG. 4A is a side cutaway cross-sectional drawing of the embodiment of the inventive manually-rotatable hubcap for wheel/axle apparatus of FIG. 4.
Figure 4B:
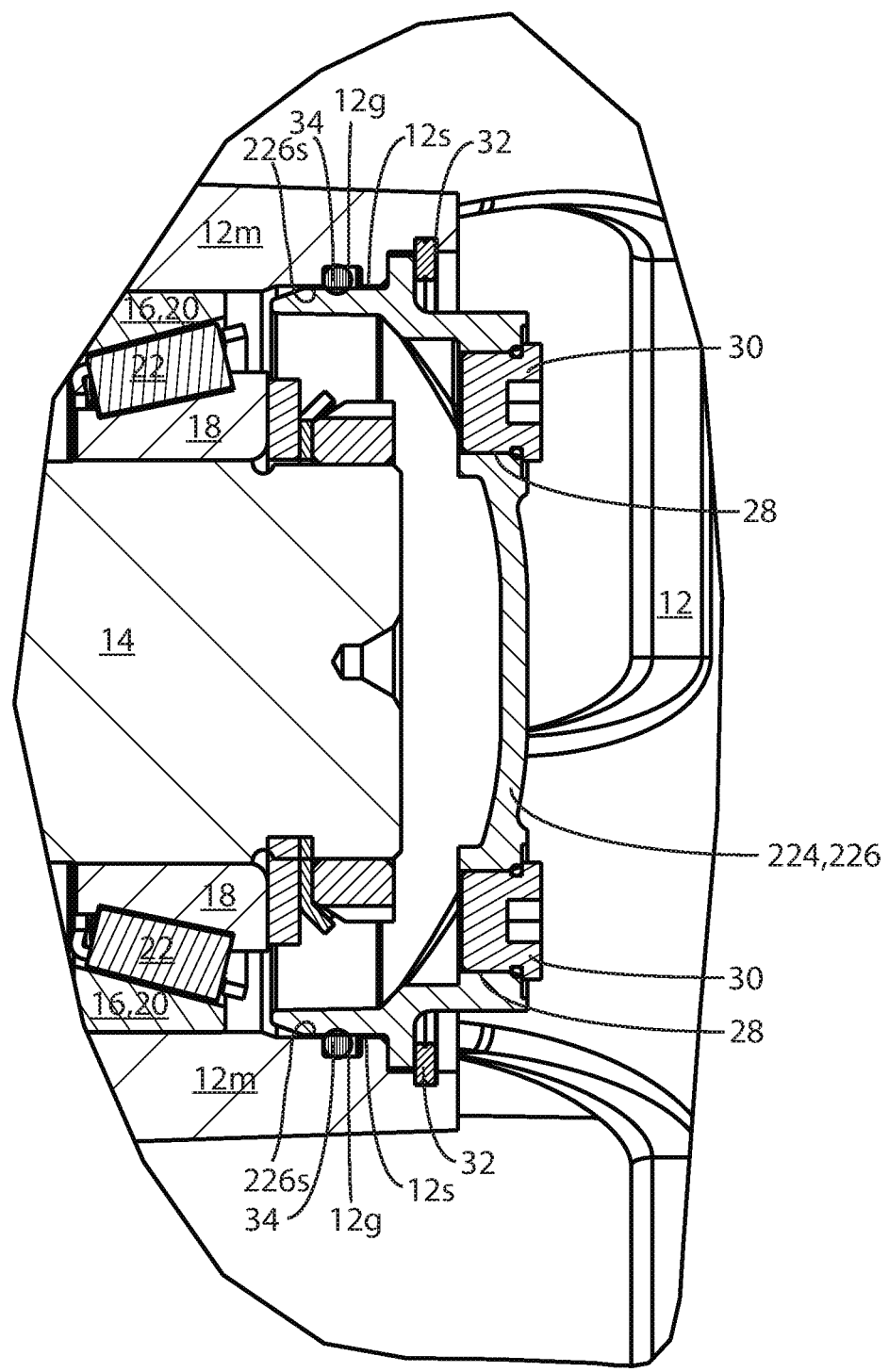
FIG. 4B is an enlarged drawing of an indicated section of FIG. 4A.

FIGS. 2, 2A, and 2B illustrate an embodiment 10 of the inventive manually-rotatable hubcap for wheel/axle apparatus. FIGS. 3, 3A, and 3B illustrate an alternative embodiment 100, and FIGS. 4, 4A, and 4B illustrate a second alternative embodiment 200 of the inventive manually-rotatable hubcap of the present invention. Elements of the various apparatus configurations which are common to all of the configurations have been assigned the same reference numbers. These include axles 14 and also roller bearings 16 and their component parts, all of which are common to embodiments 10, 100, and 200 as well as the prior art apparatus 300 as described in the background section of this document. (Note that bearings 16 are shown as roller bearings, but of course other types of bearings may be employed in such wheel/axle apparatus.)

FIGS. 2, 2A, and 2B illustrate embodiment 10 of a hubcap for wheel/axle apparatus which includes a wheel 12 mounted on a wheel mount 12m and turning on axle 14 supported by two roller bearings 16. Wheel mount 12m alternatively may be integral with wheel 12. Each roller bearing 16 includes inner race 18 installed on axle 14, outer race 20 installed in wheel mount 12m, and a plurality of rollers 22. A hubcap 24 includes a hubcap body 26, an axially-offset lubrication fill port 28 and a fill plug 30. Hubcap 24 is retained on (attached to) wheel 12 through wheel mount 12m with a retaining ring 32 (retention structure 32).

Lubricant is sealed within the apparatus by an O-ring seal 34 positioned between a wheel inner surface 12s of wheel mount 12m and a sealing surface 26s of hubcap body 26. (Note that lubricant must also be sealed within the wheel/axle apparatus by a seal at the back side of wheel 12, but the nature of such seal, well-known to those skilled in the art of mechanical design, is not the subject of this application.) Wheel inner surface 12s is substantially parallel to axle 14, and sealing surface 26s faces wheel inner surface 12s with O-ring seal 34 therebetween. A groove 12g for O-ring 34 is located on wheel inner surface 12s, positioning O-ring 34 for sealing engagement with sealing surface 26s. Thus, the functions of sealing lubricant within the apparatus 10 and retaining hubcap 24 on wheel 12 through wheel mount 12m are independent, allowing hubcap 24 to be rotated relative to axle 14 without any rotation of wheel 12 in order to position fill port 28 in a desired filling position.

Hubcap 24 also includes a grip 24p which in embodiment 10 is a hex-shaped protrusion (also numbered 24p) of hubcap body 24 configured to be gripped for manual rotation of hubcap 24 relative to wheel 12.

FIGS. 3, 3A, and 3B illustrate first alternative embodiment 100 of a hubcap for wheel/axle apparatus which includes a wheel 112 mounted on a wheel mount 112m and turning on axle 14 supported by two roller bearings 16. Each roller bearing 16 includes inner race 18 installed on axle 14, outer race 20 installed in wheel mount 112m, and a plurality of rollers 22. A hubcap 124 includes a hubcap body 126, axially-offset lubrication fill port 28 and a fill plug 130. Hubcap 124 is attached to wheel 112 through wheel mount 112m with a plurality of fasteners 132 (retention structure 132). FIG. 3 shows five fasteners 132; FIGS. 3A and 3B show two fasteners 132.

Lubricant is sealed within the apparatus by an O-ring seal 134 positioned between a wheel inner surface 112s of wheel mount 112m and a sealing surface 126s of hubcap body 126. Wheel inner surface 112s is substantially parallel to axle 14, and sealing surface 126s faces wheel inner surface 112s with O-ring seal 134 therebetween. A groove 126g for O-ring 134 is located on sealing surface 126s, positioning O-ring 134 for sealing engagement with wheel inner surface 112s. Thus, the functions of sealing lubricant within the apparatus 100 and retaining hubcap 124 on wheel 112 through wheel mount 112m are independent, allowing hubcap 124 to be rotated relative to axle 14 without any rotation of wheel 112 in order to position fill port 128 in a desired filling position. For manual rotation relative to wheel 112, hubcap 124 may be gripped by the holes (not shown) for fasteners in hubcap 124.

FIGS. 4, 4A, and 4B illustrate second alternative embodiment 200 of a hubcap for wheel/axle apparatus. Embodiment 200 is the same as embodiment 10 in most respects; thus, common reference numbering is used. The difference between embodiment 10 and embodiment 200 is that embodiment 200 includes a hubcap 224 having a hubcap body 226 which includes two axially-offset fill ports 28 and two fill plugs 30. In addition, hubcap 224 does not include protrusion 24p.

Hubcap 224 is attached to wheel 12 through wheel mount 12m with retaining ring 32 (retention structure 32). Lubricant is sealed within the apparatus by an O-ring seal 34 positioned between wheel inner surface 12s of wheel mount 12m and a sealing surface 226s of hubcap body 226. Wheel inner surface 12s is substantially parallel to axle 14, and sealing surface 226s faces wheel inner surface 12s with O-ring seal 34 therebetween. Groove 12g for O-ring 34 is located on sealing surface 12s, positioning O-ring 34 for sealing engagement with wheel inner surface 12s. Thus, the functions of sealing lubricant within the apparatus 200 and retaining hubcap 224 on wheel 12 through wheel mount 12m are independent, allowing hubcap 224 to be rotated relative to axle 14 without any rotation of wheel 12 in order to position fill ports 28 in desired filling positions. For manual rotation relative to wheel 12, hubcap 224 may be gripped by one or more fill ports 28 in hubcap 224.

While the principles of this invention have been described in connection with specific embodiments, it should be understood clearly that these descriptions are made only by way of example and are not intended to limit the scope of the invention.

The invention claimed is:

1. A manually-rotatable hubcap configured for an apparatus comprising a wheel and an axle, wherein the wheel is configured to rotate with respect to the axle and the wheel has a wheel inner surface substantially parallel to the axle, the hubcap comprising:
   a hubcap body having a lubrication filling port and a sealing surface facing the wheel inner surface;
   a retention structure configured to retain the hubcap body on the wheel such that the hubcap is rotatable independent of rotation of the wheel and axle; and
   a seal positioned directly between the sealing surface and the wheel inner surface such that the seal contacts the sealing surface and the wheel inner surfaces.

2. The manually-rotatable hubcap of claim 1 wherein the axle has an axle axis and the lubrication filling port is offset from the axle axis.

3. The manually-rotatable hubcap of claim 2 wherein the hubcap body further includes a grip to facilitate manual rotation of the hubcap, the hubcap being manually rotatable independent of rotation of the wheel.

4. The manually-rotatable hubcap of claim 2 wherein the sealing surface includes a groove and the seal is positioned therein.

5. The manually-rotatable hubcap of claim 4 wherein the seal is an O-ring.

6. The manually-rotatable hubcap of claim 2 wherein the wheel inner surface includes a groove and the seal is positioned therein.

7. The manually-rotatable hubcap of claim 6 wherein the seal is an O-ring.

8. The manually-rotatable hubcap of claim 1 wherein the retention structure is a retaining ring.

9. The manually-rotatable hubcap of claim 1 wherein the retention structure includes one or more fasteners attaching the hubcap body to the wheel.

* * * * *